(12) United States Patent
Brennesholtz (10) Patent No.: US 6,361,172 B1
(45) Date of Patent: Mar. 26, 2002

(54) COLOR PROJECTION SYSTEM INCORPORATING ELECTRO-OPTIC LIGHT MODULATOR AND ROTATING LIGHT-TRANSMISSIVE ELEMENT

(75) Inventor: Matthew Brennesholtz, Pleasantville, NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/531,702

(22) Filed: Mar. 20, 2000

(51) Int. Cl.[7] .............................................. G03B 21/14
(52) U.S. Cl. .......................... 353/81; 353/31; 348/743
(58) Field of Search ............................ 353/31, 34, 37, 353/84; 348/742, 743

(56) References Cited

U.S. PATENT DOCUMENTS

| | | | |
|---|---|---|---|
| 5,463,433 A | * | 10/1995 | Koo .............................. 353/84 |
| 5,532,763 A | | 7/1996 | Janssen et al. ............... 348/744 |
| 5,777,694 A | * | 7/1998 | Poradish ...................... 348/743 |
| 5,863,125 A | * | 1/1999 | Doany .......................... 353/84 |
| 6,266,105 B1 | * | 7/2001 | Gleckman .................... 348/743 |

\* cited by examiner

Primary Examiner—William Dowling
(74) Attorney, Agent, or Firm—Aaron Waxler (57) ABSTRACT

A color projection display system, comprising a rotatable color drum with transmissive segments on the surface of the drum, the segments composed of dichroic filters having different color transmission bands, a cylindrical lens mounted co-axially inside the drum, and means for focussing images of the boundaries between segments onto an electro-optical light modulator panel, whereby in operation the segment images are scrolled across the surface of the light modulator panel, synchronously with the application of color components of a display signal corresponding to the colors of the scrolling segment images, to produce a full color display image for projection to a viewing screen.

15 Claims, 13 Drawing Sheets

----- NOMINAL LIGHT PATH WITH NO OFFSET IN FILTER

———— ACTUAL LIGHT PATH WITH OFFSET IN FILTER

COLOR PROJECTION SYSTEM INCORPORATING ELECTRO-OPTIC LIGHT MODULATOR AND ROTATING LIGHT-TRANSMISSIVE ELEMENT

CROSS-REFERENCE TO RELATED APPLICATION

U.S. patent application Ser. No. 09/127,003 filed Jul. 31, 1998, and assigned to the assignee of the present application, relates to a color projection system incorporating an electro-optic light modulator and a rotating light-reflective element. The entire specification of Ser. No. 09/127,003 is incorporated herein by reference.

BACKGROUND OF THE INVENTION

This invention relates to color projection systems, and more particularly relates to such projection systems incorporating a single electro-optical light modulator.

Color projection display systems are known in which a white light source is separated into red, blue and green sub-beams for separate modulation by corresponding color components of an incoming display signal, and then the modulated sub-beams are recombined into a full color display for projection onto a viewing screen. Modulation of the sub-beams is commonly carried out using three separate electro-optical light modulators such as liquid crystal display (LCD) panels, one for each of the three sub-beams.

However, in one type of color projection system, described for example in U.S. Pat. No. 5,532,763, the three sub-beams are all modulated by a single LCD panel. This is accomplished by shaping the sub-beams into band-shaped cross-sections, and scrolling the bands sequentially across the LCD panel, while synchronously addressing those portions of the panel which are illuminated by the bands with the corresponding display signal information. Such projection systems are referred to herein as single panel scrolling raster (SPSR) projectors.

A disadvantage of all such SPSR systems is the requirement for a relatively large LCD (having at least an approximately 1.3 inch diagonal for the current lamp technology), in order to accept the light from the three separate primary color beams. Such large LCDs are expensive, and require the use of comparatively large, expensive optical components.

Another disadvantage of such SPSR systems is that scrolling of the beams across the panel is generally accomplished using either a single, relatively large, rotating glass prism, or three separate, smaller prisms, either of which alternatives results in a bulky arrangement, the latter having several moving parts.

OBJECTS AND SUMMARY OF THE INVENTION

It is an object of the invention to provide an improved SPSR color projection system.

It is another object of the invention to provide such an improved system in which the optical architecture is simple and compact.

It is another object of the invention to provide such an improved system having only one rotating element to accomplish scrolling.

It is yet another object of the invention to provide such an improved system in which the illumination beam is not separated into separate color beams prior to scrolling.

In accordance with the invention, a SPSR color display system includes a single, relatively small rotatable optical element with transmissive surface portions having different color transmission bands, and a single electro-optical light modulator.

In operation, the element rotates about its axis while broad spectrum (e.g., white) light from a source is incident on the proximal side of the transmissive surface, and is separated into color components by the surface portions which transmit the desired color bands. Light transmitted by the proximal side of the surface is focussed on to the distal side of the surface by a toroidal (e.g., cylindrical) lens mounted co-axially inside the hollow of the drum. The transmitted light from the distal side is focussed onto the light modulator panel. The color bands transmitted from the element are scrolled across the panel by virtue of its rotation.

Driver electronics synchronously address the panel with the corresponding color components of the display information during scrolling, whereby a full color image is produced for projection to a viewing screen.

The use of such a transmissive element as the scrolling means in a SPSR system eliminates the need to separate the white light into sub-beams prior to scrolling, and thereby enables a smaller (less than 1.3 inch) light modulator panel, and correspondingly smaller optical components. For example, such a transmissive element, e.g., a drum, can have a cross-section of 30 mm diameter or smaller. Thus, a simple and compact optical architecture is possible, leading to a compact projector with a small component count.

In accordance with a preferred embodiment, at least one opposing side of a transmissive filter segment of the surface of the element comprises a clear element or an air space, whereby the occurrence of a color artifact in the display image is eliminated. In accordance with another preferred embodiment of the invention, the rotatable optical element has a polyhedral surface, and the transmissive portions comprise dichroic filters having a flat surface.

BRIEF DESCRIPTION OF THE DRAWINGS

The invention will now be described in terms of a limited number of preferred embodiments, with reference to the drawings, in which.

DESCRIPTION OF THE PREFERRED EMBODIMENTS

Figure 1A:
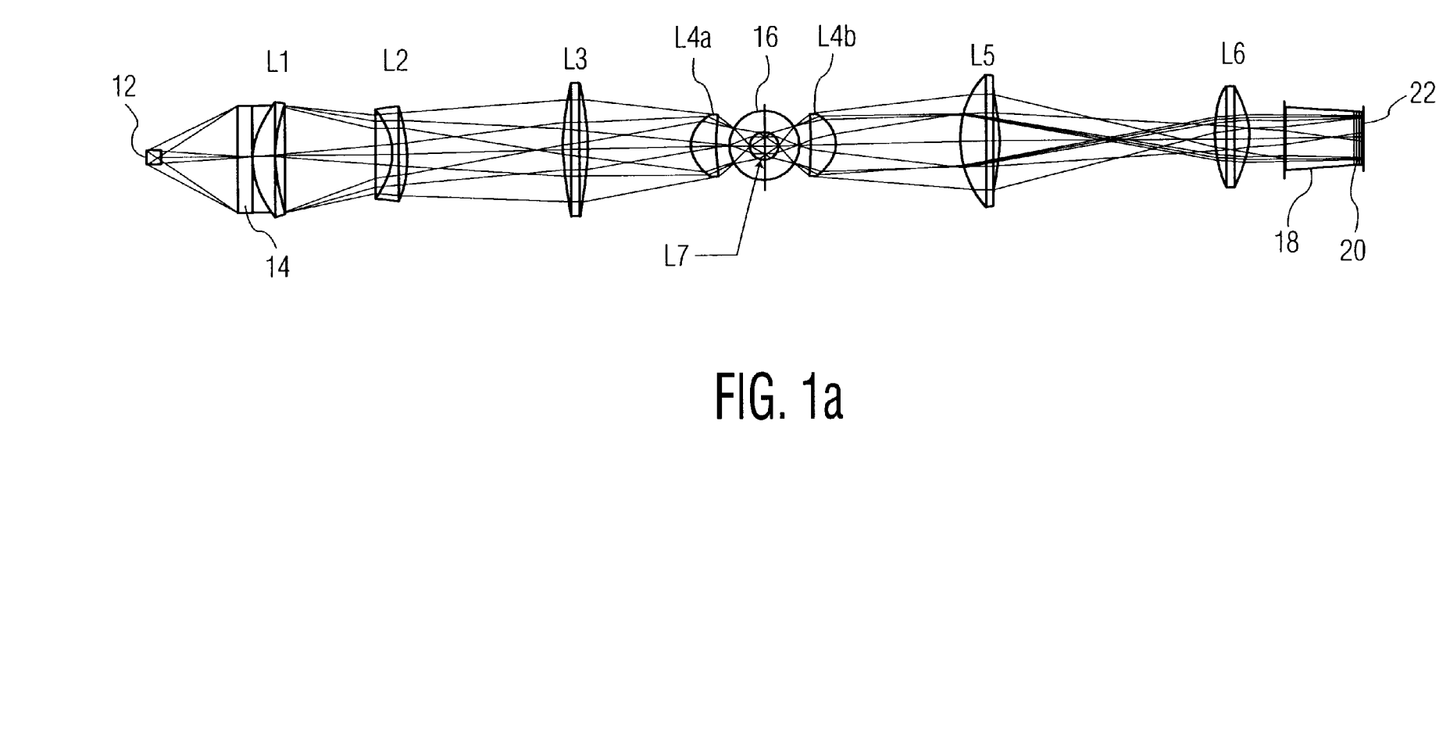
FIGS. 1a and 1b are side and top views, respectively, of a schematic layout of one embodiment of a color projection system of the invention.
Figure 1B:
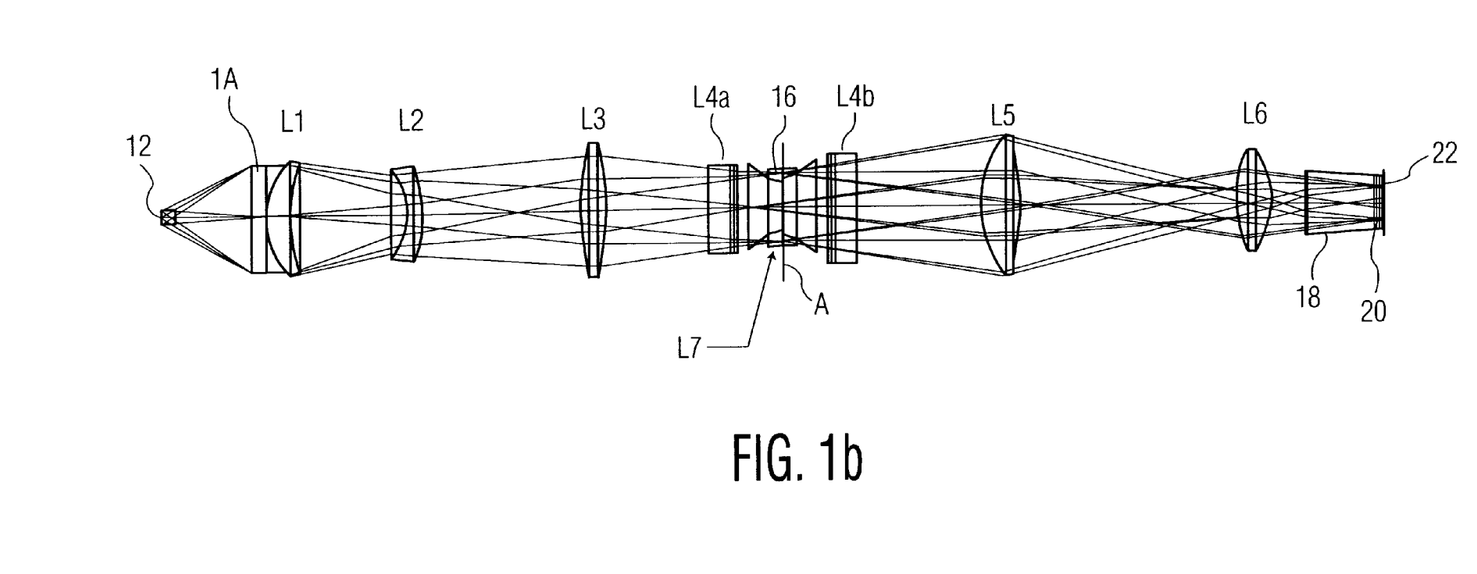

FIGS. 1a and 1b are side and top views, respectively, of a schematic diagram of one embodiment of a color projection system of the invention, incorporating a transmissive color drum. Illumination from a source, preferably a high intensity source such as a high intensity discharge (HID) lamp, is integrated by an integrating lenslet array 12, and converted to polarized light of P type polarization by PCS (polarization conversion system) 14. This P beam is focussed by spherical lenses L1, L2 and L3, and cylindrical lens L4a onto the surface of hollow drum 16. Light transmitted by the proximal side of drum 16 into the interior of the drum is focussed onto the distal side of drum 16 by cylindrical lens L7. Light transmitted from the distal side of the drum 16 is focussed by cylindrical lens L4b and aspheric lenses L5 and L6, and passes through polarization beam splitter (PBS) 18 and wide band quarter wave plate 20 onto the surface of light modulator panel 22, which in this embodiment is a reflective liquid crystal display (RLCD). RLCD 22 modifies the light in accordance with a display signal (not shown), and reflects it out of the system for projection to a viewer, via an internal reflective surface of PBS 18. Quarter wave plate 20 corrects the skew angle problem associated with the use of PBS 18 at a non-zero cone angle, as described in U.S. Pat. No. 5,453,859.

Figure 2A:
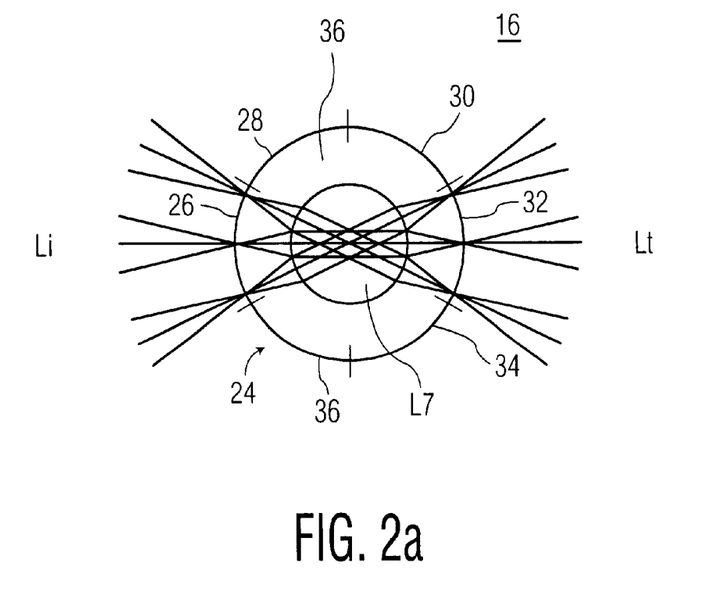
FIGS. 2a and 2b are cross-sections of one embodiment of a transmissive color drum of the invention, in different degrees of rotation about its axis, together with a co-axial cylindrical lens.
Figure 2B:
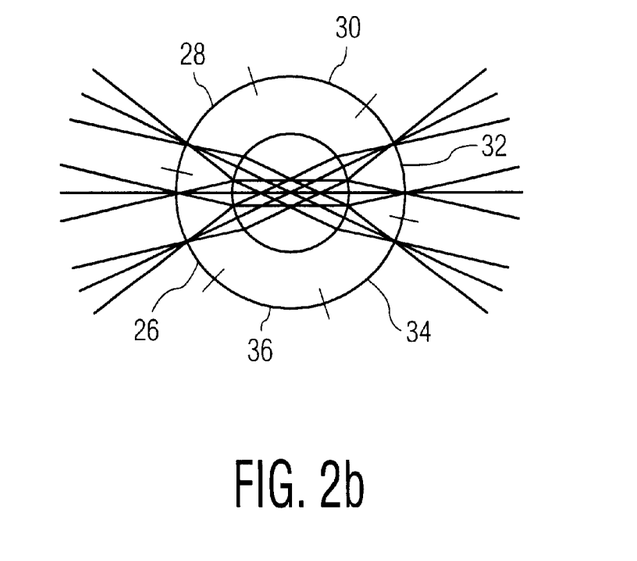

FIGS. 2a and 2b show in cross-section one embodiment of a transmissive color drum 16 of the invention, having a cylindrical surface 24 composed of six transmissive filter elements 26, 28, 30, 32, 34 and 36, arranged in opposing pairs of three different colors, red, green and blue. The drum 16 rotates counterclockwise about its rotational axis, so that the drum filters encounter incoming light Li in the sequence: red, green, blue. Mounted co-axially inside the hollow interior 36 of the drum is cylindrical lens L7.

FIG. 2a shows the drum 16 in the 0 degree position. Note that there are two cycles of red-green-blue filters around the periphery of the drum, with each filter covering 60 degrees of arc. The input light to the drum is imaged at the proximal side of the drum surface 24 by lens elements L1, L2, L3 and L4a, shown in FIG. 1. The input light covers an arc of ±25 degrees, not the full ±30 degree filter height. This allows use of the pulsed lamp color correction scheme described in co-pending U.S. patent application Ser. No. 09/177,014 (filed Oct. 22, 1998) in the projection system of this invention.

The input light Li as it comes from the integrator/PCS combination (12,14) is white light. It passes through the first surface 24 of the transmissive drum 16, which is made of transmissive filter material. While it is anticipated that for a projection application dichroic material will be used, absorptive filters may also be used. After passing through the filter 26, the light is now red. Cylindrical lens L7 on the axis A of the drum images this red light from the proximal side of surface 24 onto the distal side of surface 24. This lens L7 could alternatively be a nearly-circular toroidal lens, the exact shape being determined by the desired system optimization. Note that the imaging by this lens L7 in only in the direction perpendicular to the drum axis A. Note that all light that encountered the red filter 26 on the first passage through the drum again encounters a red filter 32 on the second passage through the drum 16. Therefore the transmitted light Lt remains red and is passed through the drum with a high degree of efficiency and color purity.

FIG. 2b shows the position of the drum 16 after it has rotated 17 degrees. In a 60 Hz system, with two red-green-blue (RGB) cycles around the periphery of the drum 16, this would occur after 1.6 ms. Notice that the topmost light bundle of Li now encounters green filter 28, and is imaged by the cylindrical lens L7 onto green filter 34. As the drum 16 rotates further, the transmitted beam will change color in the sequence RGB. Focussing the boundary lines between adjacent colors onto the light modulator panel 22 will result in a sharp demarcation between the colors as they scroll across the panel. The lens L7 does not image parallel to the drum axis A, as may be seen by comparing the side and top views of FIGS. 1a and 1b. Since the line between two adjacent colors is always horizontal, such horizontal imaging is not important to the operation of the drum projector.

Figure 3A:
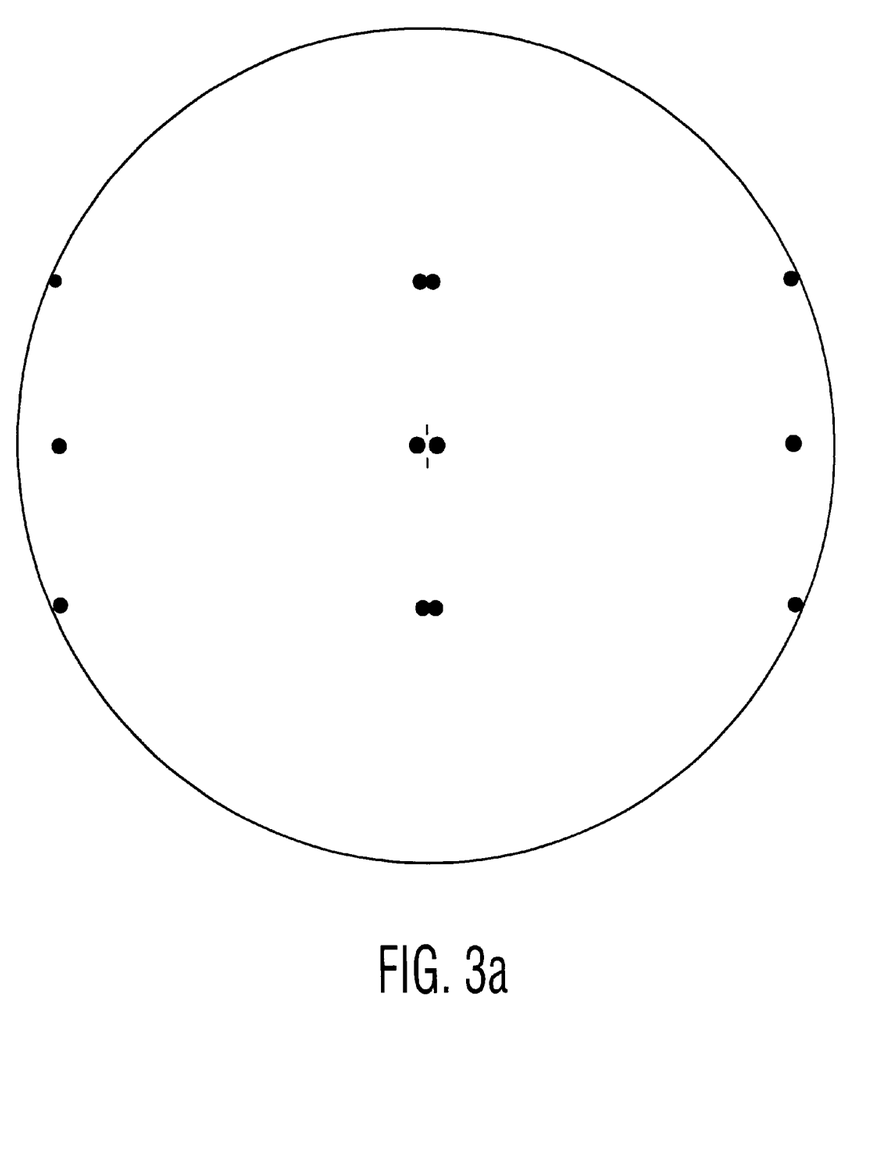
FIGS. 3a through 3c are representations of the spot sizes of light beams at first and second surfaces of the drum, and at the light modulator panel, respectively.
Figure 3B:
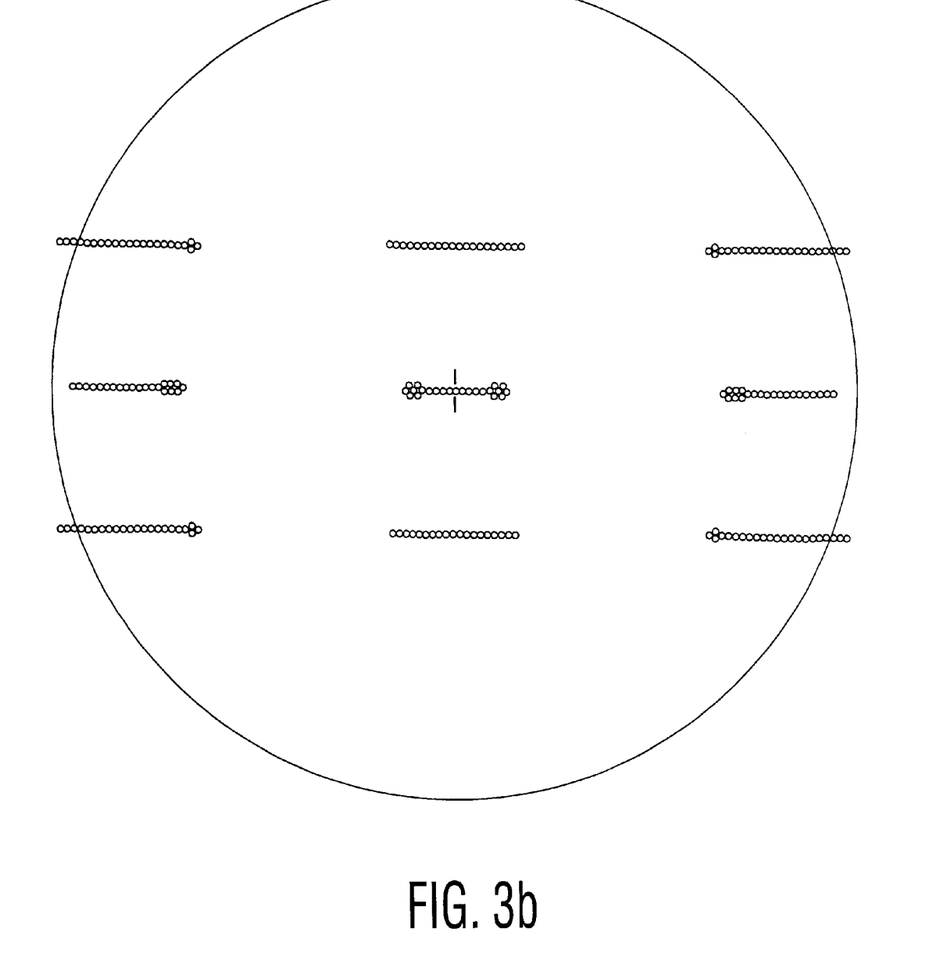
Figure 3C:
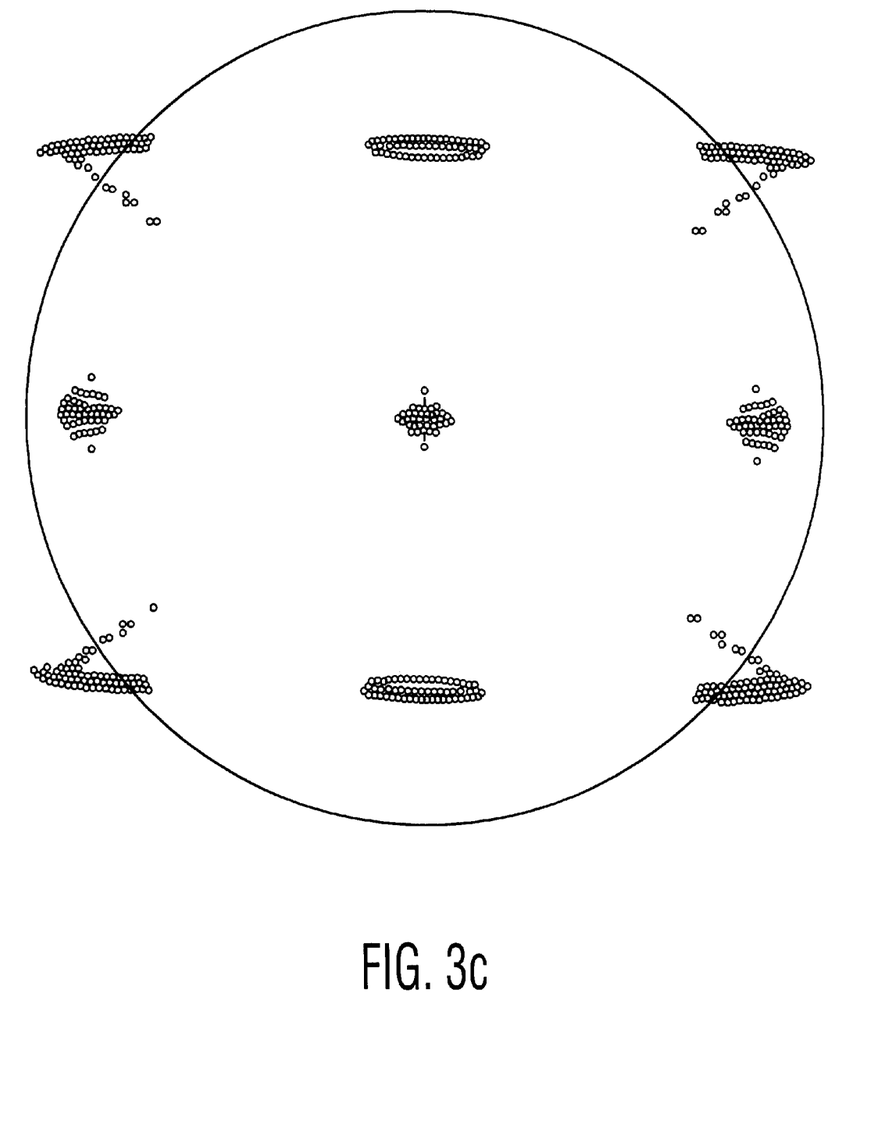
Figure 4A:
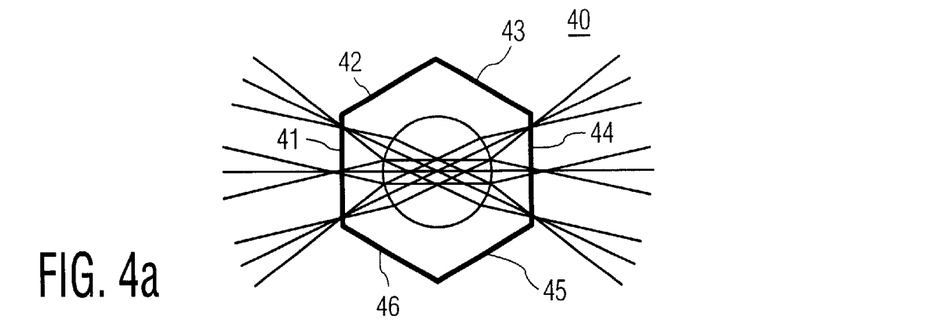
FIGS. 4a through 4g are cross-sections similar to those of FIGS. 2a and 2b for another embodiment of a transmissive color drum of the invention, in different degrees of rotation about its axis, together with a co-axial cylindrical lens.
Figure 4B:
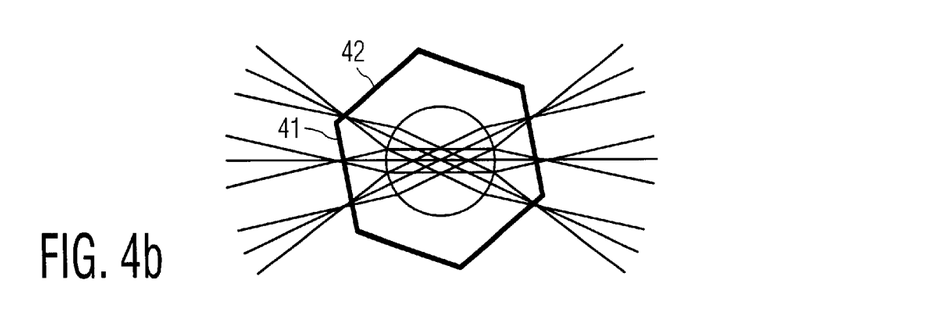
Figure 4C:
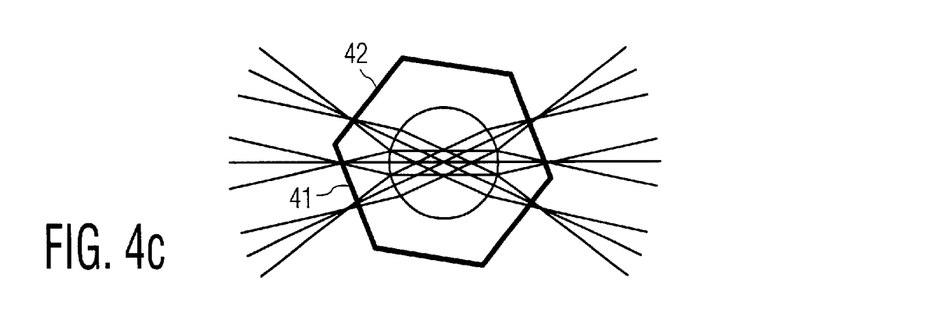
Figure 4D:
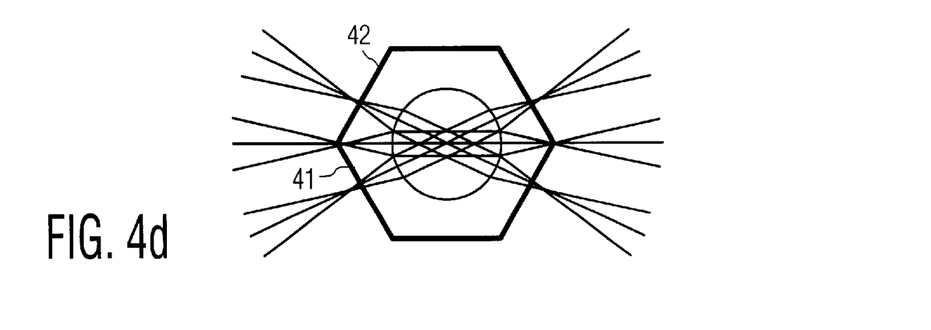
Figure 4E:
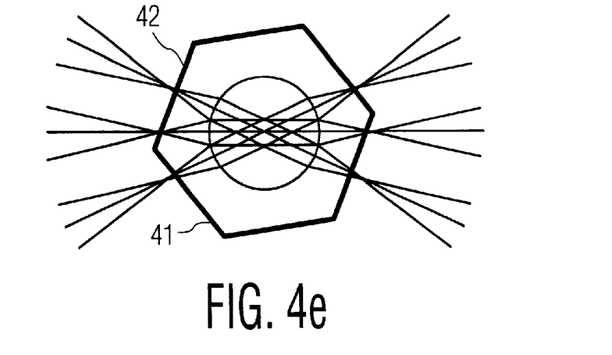
Figure 4F:
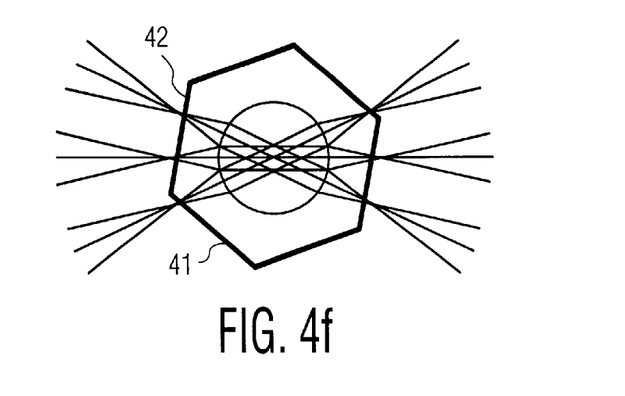
Figure 4G:
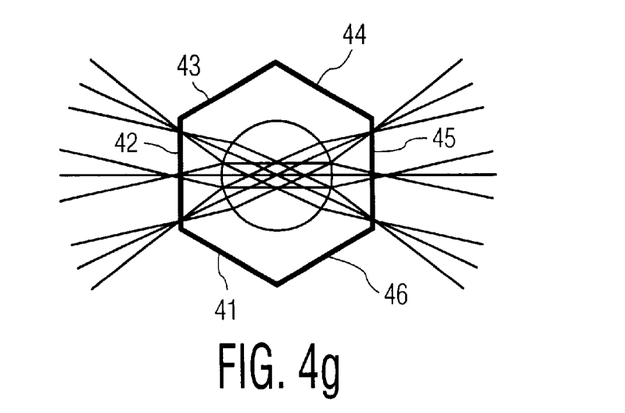

The quality of the imaging in the vertical direction by lens L7 is indicated by the image spot sizes and shapes shown in FIGS. 3a–3c. These spot sizes all correspond to a point source on the integrator lenslet 12 at the top, center and bottom of the lenslet both horizontally and vertically. FIG. 3a is at the input side of the drum 16, 3b is at the output side of the drum 16 and 3c is at the RLCD 22. Note that all the spot sizes are elongated horizontally, parallel to the division between two colors. Vertical spot size has been minimized, and a fully optimized system would minimize this vertical size still further. Even so, the spot quality shown in FIGS. 3a–3c is believed to be adequate for proper color drum operation. The main goal of further optimization would be to reduce the number of optical elements and to reduce the total path length of the projector.

FIGS. 4a–4g show another embodiment of a transmissive drum 40 of the invention, in which the filter elements 41, 42, 43, 44, 45 and 46 are flat dichroic segments.

There are several potential problems with a flat filter segment drum, especially when the segments each cover as large an angle as a 60 degree segment of the drum. Three of these problems, on closer examination, turn out to be non-issues. First, as the drum rotates the light encounters the filters at a variety of angles from +30 degrees through 0 to −30 degrees. This ±30 degree range is enough to cause a noticeable variation in color of the light passing through the filter. If this color shift with angle resulted in a top to bottom or center to top and bottom color gradient, the color shift would be unacceptable. As can been seem in FIGS. 4a–4g, this will not happen. The light going to any particular position on the panel, for instance the top of the panel, sees all possible angles of incidence during one color field time. For example, follow the rays that encounter the bottom of the red filter in FIG. 4a. These rays have an angle of incidence at the drum dichroic of +25 degrees, with a cone angle of ±12 degrees. As the drum rotates the nominal angle of incidence passes through 0 degrees between FIGS. 4c and 4d. When the drum rotates into the position shown in FIG. 4f, the light now has an angle of −25 degrees on the drum. The effect of this variation in angle is that the effective cut-off slope of the filter is reduced, and the effective 50% point is displaced slightly toward a shorter wavelength compared to the filter at normal incidence. For 60 Hz operation, one color field time is 5.6 ms. The eye will integrate the color variation over this field time and not perceive it. The filter design can easily accommodate the slight 50% wavelength shift introduced by the rotating drum. If the reduced slope is a colorimetry problem, low angular shift filters such as the ones described in U.S. Pat. No. 5,999,321, can be designed to reduce the effect.

The second potential problem is that the flat segments 41–46 follow chords of a circle and the surfaces of the filters moves toward and away from the focal point as the drum 40 rotates. This is not a problem because the only position on the drum where spot size is an issue is at the boundary between two different colors. This boundary always occurs at the nominal drum diameter and therefore the nominal focal position.

Figure 5:
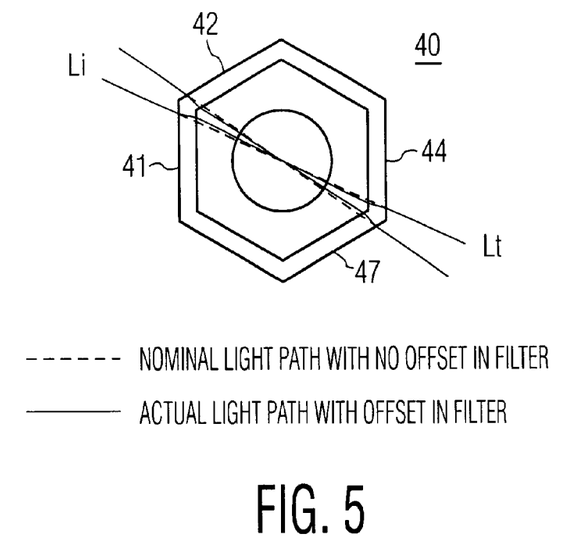
FIG. 5 is a cross section of a transmissive color drum of the invention, showing nominal and actual light paths through the color filters.

There is another potential problem associated with the flat filter segments 41–46. These segments have a finite thickness and thus when tilted in the optical path, they displace the beam slightly. For glass plates having a refractive index $n_g=1.50$, a thickness of 1.0 mm, and a tilt of 30 degrees, the displacement is approximately 0.22 mm. However, the displacement caused by the first passage through the surface of the drum is counteracted by the displacement caused by second passage through the surface of the drum. While opposing segments are parallel and one might expect the displacements to add, this is not the case due to the imaging of the cylindrical lens in the center of the drum effectively reversing the direction of the displacement caused by the first passage through the surface. This effect is shown in FIG. 5, with two rays through drum 40, tracing the nominal light path with no filter offset effect (dashed lines) and the actual light path with compensating offsets (solid lines).

Figure 6:
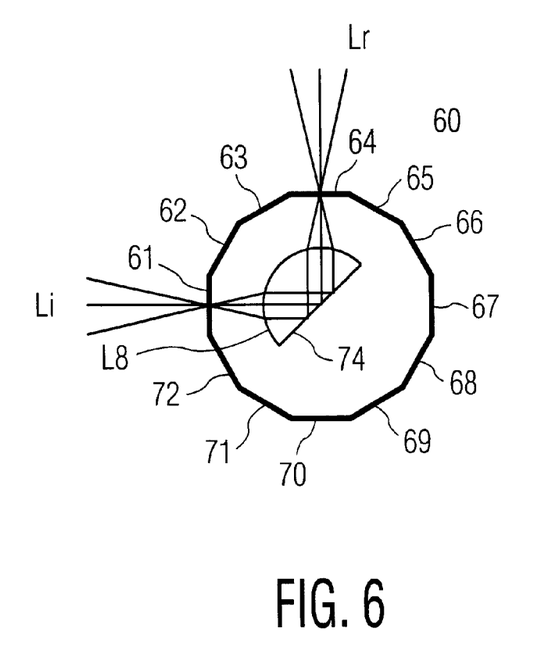
FIG. 6 is a cross-section of yet another embodiment of a transmissive color drum of the invention, with a folded light path.

FIG. 6 shows another embodiment of a drum 60 of the invention. In this embodiment, instead of an imaging cylindrical lens at the center of the drum, an imaging cylindrical mirror or semi-cylindrical lens/mirror combination L8 is employed. This allows the light path to be folded at the drum. FIG. 6 shows this configuration for a drum 60 with 12 flat filter segments 61–72, and thus 4 RGB cycles around the periphery. This results in a 90 degree fold of the optical path at the drum. The rays Li experience total internal reflection (TIR) at the flat surface 74 of the lens L8 so a separate mirror coating may be unnecessary.

When employing a drum with dichroic filter segments, it may be advantageous to replace one of an opposing pair of same-color filter segments with a clear segment or an air gap, in order to avoid a color artifact which may occur under certain conditions.

Figure 7A:
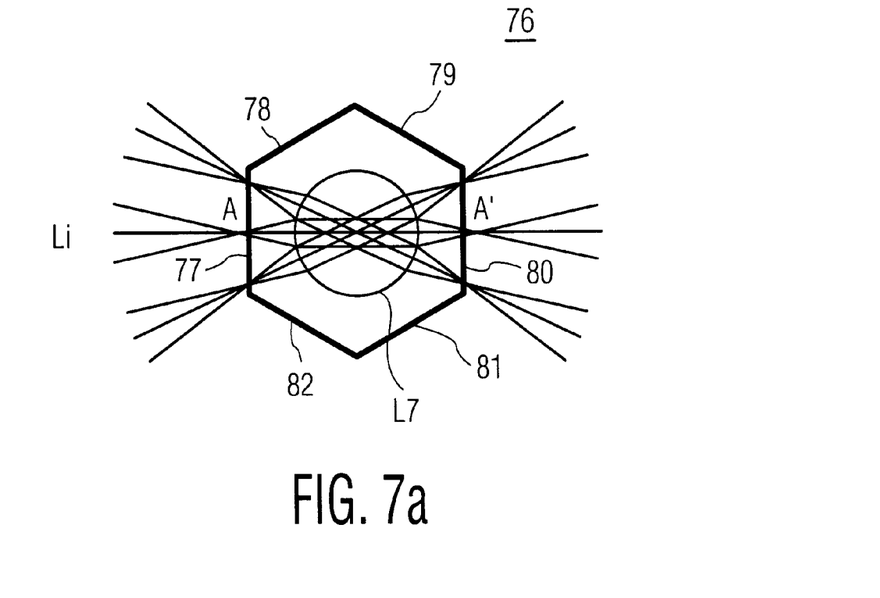
FIGS. 7a and 7b are cross-sections similar to those of FIGS. 2a and 2b, showing the transmissive color drum at 0 and 35 degrees of rotation about its axis.
Figure 7B:
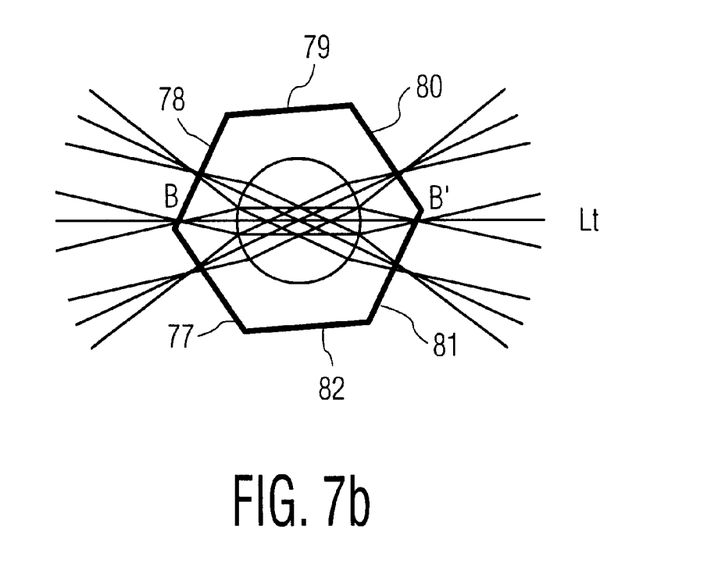

FIG. 7a shows a drum 76 of hexagonal cross-section at a 0 degrees rotation angle, with the red dichroics (77,80) in the optical path. Light Li from the illumination source is focused, for example, on point A. Red light passes through the dichroic filter 77 and the blue and green light is reflected. The red light is focused in the vertical direction by the cylindrical lens L7 on the axis of the drum and imaged at point A'. After passing through the second red dichroic 80, it is re-imaged on the horizontal centerline of the panel 22. As the drum 76 rotates, the center of the panel 22 continues to be illuminated with red light until the edge of the red dichroics (77,80) pass focal points (A,A'); and the center line of the panel 22 is illuminated with green light through green dichroics (78,81), as shown in FIG. 7b.

Figure 8:
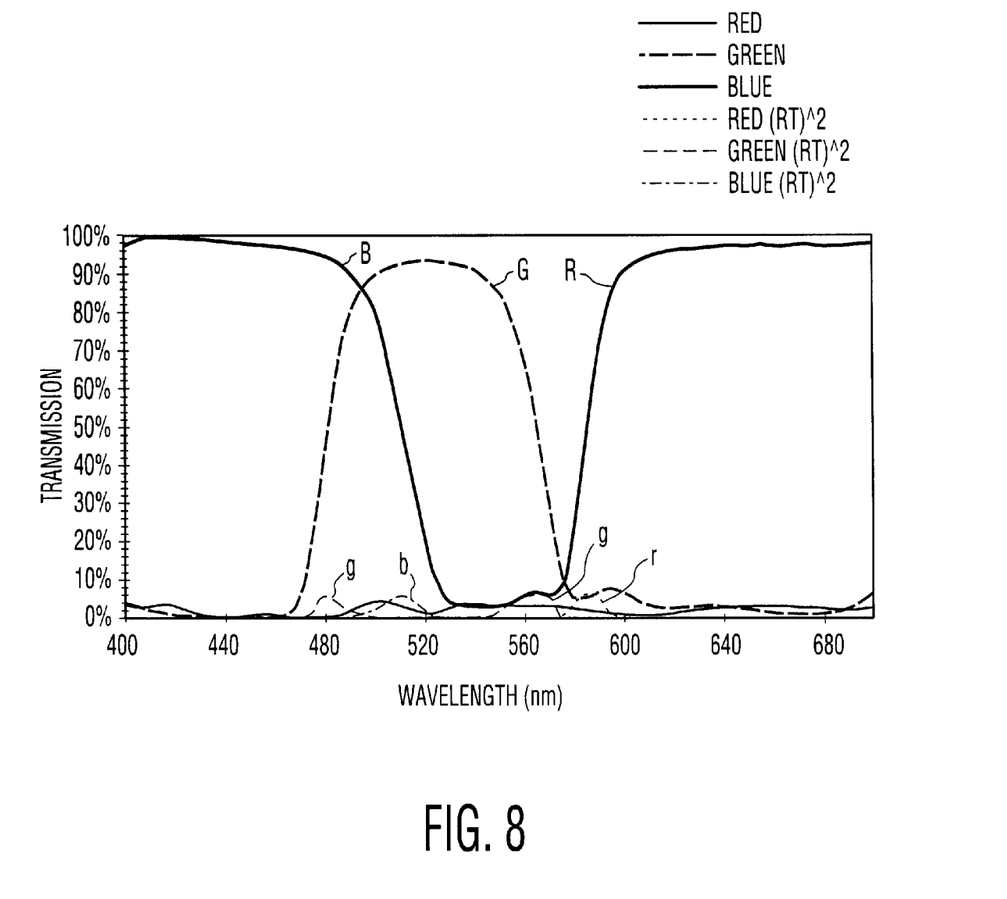
FIG. 8 is a plot of transmission versus wavelength for typical red, green and blue dichroic filters, and for a color artifact.

Most of the light in the system behaves as just described. This produces a set of colored bars that scroll vertically down the light valve. Unfortunately, some light behaves differently, due to the fact that the pass bands of dichroic filters are defined by a transmission curves of finite slope. FIG. 8 shows transmission curves R, G, B for typical red, green and blue dichroic filters.

Thus, for example, in the case of the red filter, curve R, at wavelengths longer than about 596 nm, substantially all of the light is transmitted, while at wavelengths shorter than 572 nm, substantially all of the light is reflected at point A and never reach point A'. However, for intermediate wavelengths of 572–596 nm, particularly at 585 nm, where the transmission is exactly 50%, the transmitted light is imaged by the cylinder on axis onto point A'. 50% of this light, which contains 25% of the original energy, is reflected back to the cylindrical lens and is re-imaged onto point A. Once again, 50% is transmitted and 50% is reflected. This reflected light represents 12.5% of the original energy, and is imaged a second time at point A', and so on. As the drum rotates, this light at 585 nm, which is distinctly yellow, is spread in the vertical direction into a band of light which scans vertically at a different rate than the primary color bands, contaminating them and producing non-uniform, desaturated colors.

This effect occurs whenever the transmission is at or near 50%. The magnitude of this effect is shown in FIG. 8 as dashed lines r, g and b. In a projection system with a UHP lamp with a yellow emission line at 578 nm, this problem would be particularly severe for the red dichroic. The green dichroic, with a 50% cut-off value of 566 nm could also be affected. Due to the variation from lot-to-lot in dichroic filters, the effect could vary in severity from one projector to another, causing quality control problems.

One solution to this problem is shown in FIGS. 9a–9d. In this design, dichroic filters, shown as red, green and blue filters (91–93), are paired with AR coated clear segments (94–96), shown as dashed lines. Since there is little or no reflection off the AR coated glass, there is little or no possibility of forming an undesired image through multiple reflections.

Figures 9A, 9B:
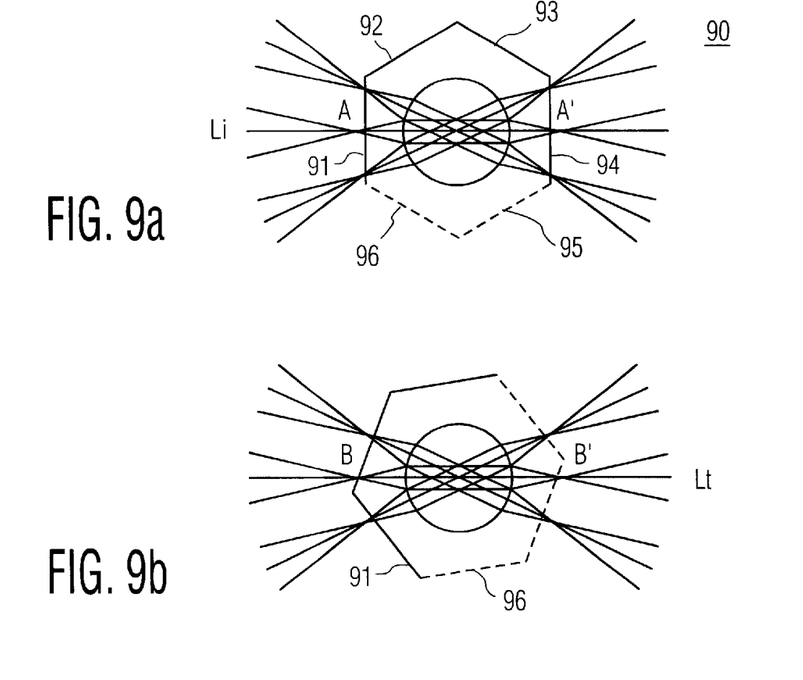
FIGS. 9a–9d are cross-sections similar to those of FIGS. 7a and 7b, showing additional embodiments of a transmissive color drum of the invention with one of a filter pair replaced by a clear segment.

In FIG. 9a, the incoming light Li falls first on the red segment 91 at point A. Red light plus 50% of the yellow light at 585 nm passes through the segment 91 and is imaged by the cylindrical lens L7 onto the matching clear (or missing) segment 94. If a clear, AR coated, segment is used, one could expect about 1% reflection. Therefore ½% of the original light at 585 nm is reflected at point A' and re-imaged onto point A. Here 50% of the light is reflected a second time, or a total of 0.25% of the original light, and so on. The total amount of 585 nm light which is imaged at the screen is thereby reduced to only 4% of the light which would have been imaged in the case of paired dichroic filters.

Figure 9C:
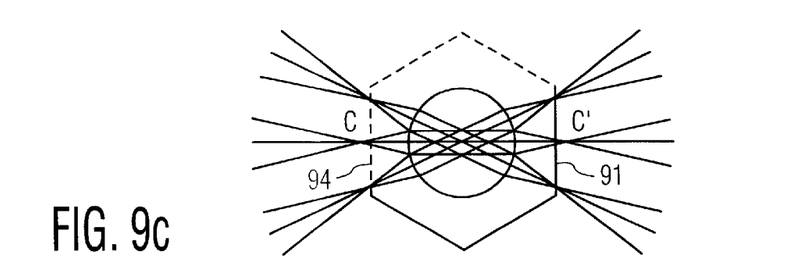
Figure 9D:
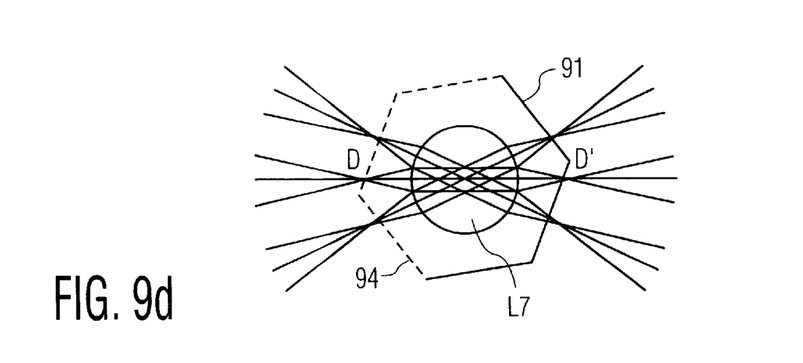

In FIG. 9c, the drum has rotated 180 degrees and the light encounters the clear segment 94 first at position C. All of the light is imaged onto location C'. Here the red light is transmitted, as well as 50% of the 585 nm yellow light. This transmitted light is imaged onto the light valve 22 and eventually the screen. 50% of the yellow light is reflected at C', 1% is again reflected at C, 50% is transmitted after re-imaging at C', for a total of 0.25%. Again, the problem will only be 4% of the problem with paired dichroic filters.

While the problem has been described in terms of the cut-on wavelength of the red dichroics at 585 nm, it can also occur at the cut-on and cut-off of the green dichroics (e.g., 482 and 566 nm, respectively), or the cut-off of the blue dichroics (e.g., 512 nm). In each case, the solution to the problem is the same as described above.

Figure 10:
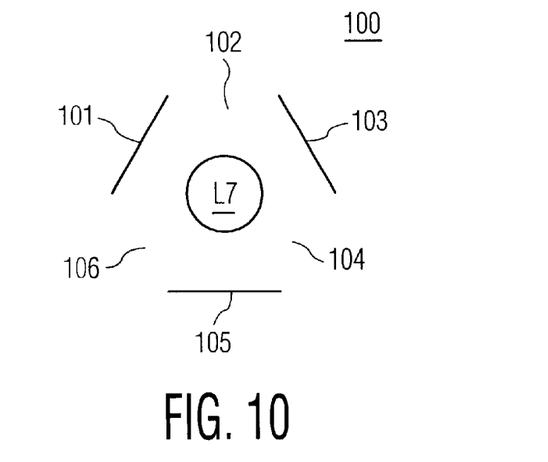
FIG. 10 is a cross-section of a transmissive color drum of the invention in which one of a filter pair is replaced by air.

In the embodiment of FIGS. 9a–9d, the clear segments are included mainly for reasons of dynamically balancing the rotating drum 90. An alternative design, shown in FIG. 10, omits these clear segments altogether. With no segment present, there is no possibility of undesired reflections. The drum 100 is balanced by alternating filter segments 101, 103 and 105 with air spaces 102, 104 and 106.

Other possible solutions to this problem are: 1) replacing one of a dichroic filter pair with an absorptive filter; and 2) inserting a narrow band rejection (e.g., notch) filter into the non-moving portion of the illumination path designed to reject light at the green/red transition wavelengths (to remove yellow light which is prevalent in the spectra of some high pressure discharge lamps, such as the Philips UHP lamp), and optionally to also reject light at the blue/green transition wavelengths.

Figure 11:
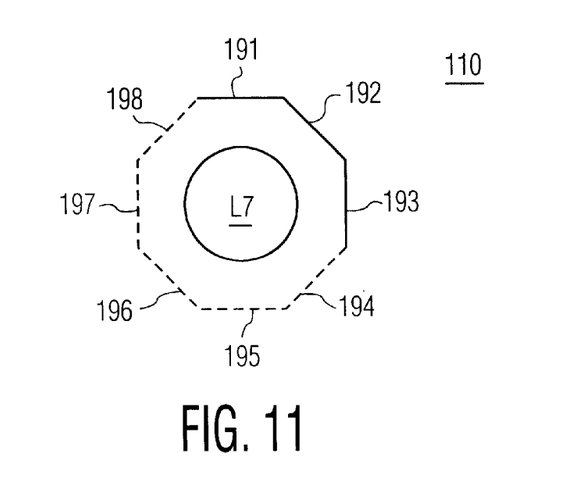
FIG. 11 is a cross-section of another embodiment of a transmissive color drum of the invention for use in a red, green, blue and white projection system.

FIG. 11 shows an octahedral drum design 110 suitable for use in a red, green, blue, white projection system. Red, green and blue filter segments 191, 192, 193 are paired with clear segments 195, 196 and 197, for the R, G, B components, and clear segment 194 is paired with another clear segment 195 for the white component. Such a system is used to enhance the brightness of the image on the screen at the expense of color purity.

Figure 12:
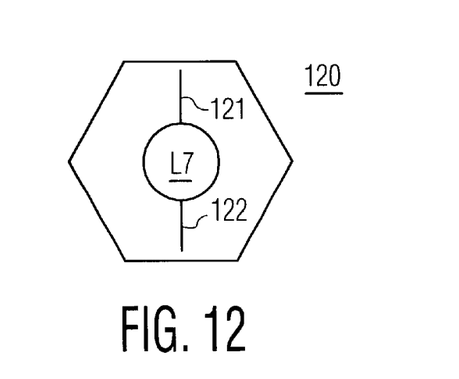
FIG. 12 is a cross-section of yet another embodiment of a transmissive color drum of the invention having interior light shields.

Another potential problem may be encountered when stray light passes through the color drum 120 and misses the cylindrical lens L7 on the axis of the drum. As shown in FIG. 12, non-rotating optical shields 121, 122, mounted on either the cylindrical lens L7 or a lens holder (not shown) prevent this light from reaching the electro-optical light modulator and causing color artifacts.

The invention has been described in terms of a limited number of embodiments. Other embodiments, variations of embodiments and art-recognized equivalents will become apparent to those skilled in the art, and are intended to be encompassed within the scope of the invention, as set forth in the appended claims.

For example, the projection system could have fewer total optical elements, fewer custom optical elements, improved spot size, and/or shorter total length. The drum, while shown in the preferred embodiments as having an air space between the surface and interiorly mounted toroidal lens, this space could be partially or completely filled with a material having a lower refractive index than that of the toroidal lens.

What I claim as my invention is:

1. A color display system, comprising a single, rotatable optical element with a transmissive surface having portions with different color transmission bands, means for focussing light from a source onto a proximal side of the transmissive surface of the element, a toroidal lens mounted inside the element for focussing light from the proximal side of the surface to a distal side of the surface, a single electro-optical light modulator panel, means for imaging light transmitted from the distal side of the surface of the element onto to light modulator panel, and means for rotating the element about its axis of rotation, whereby color bands transmitted by the rotating element are scrolled across the panel.

2. The color display system of claim 1 in which driver electronics are provided for synchronously addressing the panel with corresponding color components of a display signal during scrolling to produce a color display image.

3. The color display system of claim 2 in which means are provided for projecting the display image onto a viewing screen.

4. The color display system of claim 1 in which the rotatable optical element has a cylindrical surface comprised of curved filter segments.

5. The color display system of claim 1 in which the rotatable optical element has a polyhedral surface comprised of flat filter segments.

6. The color display system of claim 1 in which the portions with different color transmission bands comprise dichroic filters.

7. The color display system of claim 6 in which some of the portions are clear segments.

8. The color display system of claim 7 in which some of the clear segments are omitted.

9. The color display system of claim 1 in which the means for focussing light transmitted from the source onto to proximal side of the element comprises at least one lens positioned between the source and the element.

10. The color display system of claim 1 in which the means for focussing light transmitted from the distal side of the element onto to light modulator panel comprises at least one lens positioned between the element and the panel.

11. The color display system of claim 1 in which the light modulator panel is a reflective LCD panel.

12. The color display system of claim 11 in which means are provided for converting unpolarized light from the source into linearly polarized light.

13. The color display system of claim 1 in which stationary light shields are mounted inside the rotatable optical element.

14. The color display system of claim 1 in which a narrow band rejection filter is placed between the source and the panel.

15. The color display system of claim 1 in which the toroidal lens is mounted co-axially with the element.

* * * * *